(12) United States Patent
Drimbarean et al.

(10) Patent No.: US 7,953,287 B2
(45) Date of Patent: *May 31, 2011

(54) IMAGE BLURRING

(75) Inventors: Alexandru Drimbarean, Galway (IE); Peter Corcoran, Clarelgalway (IE); Eran Steinberg, San Francisco, CA (US)

(73) Assignee: Tessera Technologies Ireland Limited, Galway (IE)

( * ) Notice: Subject to any disclaimer, the term of this patent is extended or adjusted under 35 U.S.C. 154(b) by 371 days.

This patent is subject to a terminal disclaimer.

(21) Appl. No.: 12/253,839

(22) Filed: Oct. 17, 2008

(65) Prior Publication Data

US 2009/0040342 A1 Feb. 12, 2009

Related U.S. Application Data

(62) Division of application No. 11/673,560, filed on Feb. 10, 2007, now Pat. No. 7,469,071.

(60) Provisional application No. 60/773,714, filed on Feb. 14, 2006.

(51) Int. Cl.
   *G06K 9/40* (2006.01)

(52) U.S. Cl. .......................... 382/254; 372/274

(58) Field of Classification Search .................. 382/254, 382/255, 264, 274, 275, 284, 298

See application file for complete search history.

(56) References Cited

U.S. PATENT DOCUMENTS

| | | | |
|---|---|---|---|
| 4,683,496 A | 7/1987 | Tom | |
| 5,046,118 A | 9/1991 | Ajewole et al. | |
| 5,063,448 A | 11/1991 | Jaffray et al. | |
| 5,086,314 A | 2/1992 | Aoki et al. | |
| 5,109,425 A | 4/1992 | Lawton | |
| 5,130,935 A | 7/1992 | Takiguchi | |
| 5,164,993 A | 11/1992 | Capozzi et al. | |
| 5,329,379 A | 7/1994 | Rodriguez et al. | |
| 5,500,685 A | 3/1996 | Kokaram | |
| 5,504,846 A | 4/1996 | Fisher | |
| 5,534,924 A | 7/1996 | Florant | |
| 5,594,816 A | 1/1997 | Kaplan et al. | |
| 5,621,868 A | 4/1997 | Mizutani et al. | |
| 5,724,456 A | 3/1998 | Boyack et al. | |
| 5,812,787 A | 9/1998 | Astle | |

(Continued)

FOREIGN PATENT DOCUMENTS

EP 1367538 A2 12/2003

(Continued)

OTHER PUBLICATIONS

PCT Notification of Transmittal of the International Search Report and the Written Opinion of the International Searching Authority, or the Declaration, PCT/US07/61956, dated Mar. 14, 2008, 9 pages.

(Continued)

*Primary Examiner* — Phuoc Tran

(74) *Attorney, Agent, or Firm* — Andrew V. Smith

(57) ABSTRACT

A method of blurring an image includes acquiring two images of nominally a same scene taken at a different light exposure levels. At least one region of one of the images includes pixels having saturated intensity values. For at least one of the saturated pixels, values are extrapolated from the other image. At least a portion of a third image is blurred and re-scaled including pixels having the extrapolated values.

18 Claims, 4 Drawing Sheets

U.S. PATENT DOCUMENTS

| | | |
|---|---|---|
| 5,844,627 A | 12/1998 | May et al. |
| 5,878,152 A | 3/1999 | Sussman |
| 5,880,737 A | 3/1999 | Griffin et al. |
| 5,949,914 A | 9/1999 | Yuen |
| 5,990,904 A | 11/1999 | Griffin |
| 6,005,959 A | 12/1999 | Mohan et al. |
| 6,008,820 A | 12/1999 | Chauvin et al. |
| 6,018,590 A | 1/2000 | Gaborski |
| 6,061,476 A | 5/2000 | Nichani |
| 6,069,635 A | 5/2000 | Suzuoki et al. |
| 6,069,982 A | 5/2000 | Reuman |
| 6,122,408 A | 9/2000 | Fang et al. |
| 6,198,505 B1 | 3/2001 | Turner et al. |
| 6,240,217 B1 | 5/2001 | Ercan et al. |
| 6,243,070 B1 | 6/2001 | Hill et al. |
| 6,292,194 B1 | 9/2001 | Powell, III |
| 6,326,964 B1 | 12/2001 | Snyder et al. |
| 6,407,777 B1 | 6/2002 | DeLuca |
| 6,483,521 B1 | 11/2002 | Takahashi et al. |
| 6,526,161 B1 | 2/2003 | Yan |
| 6,535,632 B1 | 3/2003 | Park et al. |
| 6,538,656 B1 | 3/2003 | Cheung et al. |
| 6,577,762 B1 | 6/2003 | Seeger et al. |
| 6,577,821 B2 | 6/2003 | Malloy Desormeaux |
| 6,593,925 B1 | 7/2003 | Hakura et al. |
| 6,631,206 B1 | 10/2003 | Cheng et al. |
| 6,670,963 B2 | 12/2003 | Osberger |
| 6,678,413 B1 | 1/2004 | Liang et al. |
| 6,683,992 B2 | 1/2004 | Takahashi et al. |
| 6,744,471 B1 | 6/2004 | Kakinuma et al. |
| 6,756,993 B2 | 6/2004 | Popescu et al. |
| 6,781,598 B1 | 8/2004 | Yamamoto et al. |
| 6,803,954 B1 | 10/2004 | Hong et al. |
| 6,804,408 B1 | 10/2004 | Gallagher et al. |
| 6,836,273 B1 | 12/2004 | Kadono |
| 6,842,196 B1 | 1/2005 | Swift et al. |
| 6,850,236 B2 | 2/2005 | Deering |
| 6,930,718 B2 | 8/2005 | Parulski et al. |
| 6,952,225 B1 | 10/2005 | Hyodo et al. |
| 6,956,573 B1 | 10/2005 | Bergen et al. |
| 6,987,535 B1 | 1/2006 | Matsugu et al. |
| 6,989,859 B2 | 1/2006 | Parulski |
| 6,990,252 B2 | 1/2006 | Shekter |
| 7,013,025 B2 | 3/2006 | Hiramatsu |
| 7,035,477 B2 | 4/2006 | Cheatle |
| 7,042,505 B1 | 5/2006 | DeLuca |
| 7,054,478 B2 | 5/2006 | Harman |
| 7,064,810 B2 | 6/2006 | Anderson et al. |
| 7,081,892 B2 | 7/2006 | Alkouh |
| 7,102,638 B2 | 9/2006 | Raskar et al. |
| 7,103,227 B2 | 9/2006 | Raskar et al. |
| 7,103,357 B2 | 9/2006 | Kirani et al. |
| 7,149,974 B2 | 12/2006 | Girgensohn et al. |
| 7,206,449 B2 | 4/2007 | Raskar et al. |
| 7,218,792 B2 | 5/2007 | Raskar et al. |
| 7,295,720 B2 | 11/2007 | Raskar |
| 7,317,843 B2 | 1/2008 | Sun et al. |
| 7,359,562 B2 | 4/2008 | Raskar et al. |
| 7,394,489 B2 | 7/2008 | Yagi |
| 7,469,071 B2 * | 12/2008 | Drimbarean et al. ......... 382/254 |
| 2001/0000710 A1 | 5/2001 | Queiroz et al. |
| 2001/0012063 A1 | 8/2001 | Maeda |
| 2002/0028014 A1 | 3/2002 | Ono |
| 2002/0080261 A1 | 6/2002 | Kitamura et al. |
| 2002/0093670 A1 | 7/2002 | Luo et al. |
| 2002/0191860 A1 | 12/2002 | Cheatle |
| 2003/0038798 A1 | 2/2003 | Besl et al. |
| 2003/0052991 A1 | 3/2003 | Stavely et al. |
| 2003/0091225 A1 | 5/2003 | Chen |
| 2003/0103159 A1 | 6/2003 | Nonaka |
| 2003/0169944 A1 | 9/2003 | Dowski et al. |
| 2003/0184671 A1 | 10/2003 | Robins et al. |
| 2004/0047513 A1 | 3/2004 | Kondo et al. |
| 2004/0145659 A1 | 7/2004 | Someya et al. |
| 2004/0201753 A1 | 10/2004 | Kondo et al. |
| 2004/0208385 A1 | 10/2004 | Jiang |
| 2004/0223063 A1 | 11/2004 | DeLuca et al. |
| 2005/0017968 A1 | 1/2005 | Wurmlin et al. |
| 2005/0031224 A1 | 2/2005 | Prilutsky et al. |
| 2005/0041121 A1 | 2/2005 | Steinberg et al. |
| 2005/0058322 A1 | 3/2005 | Farmer et al. |
| 2005/0140801 A1 | 6/2005 | Prilutsky et al. |
| 2005/0213849 A1 | 9/2005 | Kreang-Arekul et al. |
| 2005/0243176 A1 | 11/2005 | Wu et al. |
| 2005/0271289 A1 | 12/2005 | Rastogi |
| 2006/0008171 A1 | 1/2006 | Petschnigg et al. |
| 2006/0039690 A1 | 2/2006 | Steinberg et al. |
| 2006/0104508 A1 | 5/2006 | Daly et al. |
| 2006/0153471 A1 | 7/2006 | Lim et al. |
| 2006/0181549 A1 | 8/2006 | Alkouh |
| 2006/0193509 A1 | 8/2006 | Criminisi et al. |
| 2007/0237355 A1 | 10/2007 | Song et al. |

FOREIGN PATENT DOCUMENTS

| | | |
|---|---|---|
| JP | 2281879 A2 | 11/1990 |
| JP | 4127675 A2 | 4/1992 |
| JP | 6014193 A2 | 1/1994 |
| JP | 8223569 A2 | 8/1996 |
| JP | 10285611 A2 | 10/1998 |
| JP | 20102040 A2 | 4/2000 |
| JP | 20299789 A2 | 10/2000 |
| JP | 21101426 A2 | 4/2001 |
| JP | 21223903 A2 | 8/2001 |
| JP | 22112095 A2 | 4/2002 |
| JP | 23281526 A2 | 10/2003 |
| JP | 24064454 A2 | 2/2004 |
| JP | 24166221 A2 | 6/2004 |
| JP | 24185183 A2 | 7/2004 |
| JP | 26024206 A2 | 1/2006 |
| JP | 26080632 A2 | 3/2006 |
| JP | 26140594 A2 | 6/2006 |
| WO | WO-9426057 A1 | 11/1994 |
| WO | WO-02052839 A2 | 7/2002 |
| WO | WO-02089046 A1 | 11/2002 |
| WO | WO-2004017493 A1 | 2/2004 |
| WO | WO-2004036378 A2 | 4/2004 |
| WO | WO-2004059574 A2 | 7/2004 |
| WO | WO-2005015896 A1 | 2/2005 |
| WO | WO-2005076217 A2 | 8/2005 |
| WO | WO-2005099423 A2 | 10/2005 |
| WO | WO-2005101309 A1 | 10/2005 |
| WO | WO-2007025578 A1 | 3/2007 |
| WO | WO-2007073781 A1 | 7/2007 |
| WO | WO-2007093199 A2 | 8/2007 |
| WO | WO-2007095477 A2 | 8/2007 |

OTHER PUBLICATIONS

Adelson, E.H., "Layered Representations for Image Coding, http://web.mit.edu/persci/people/adelson/pub.sub.--pdfs/layers91.pdf.", Massachusetts Institute of Technology, 1991, 20 pages.

Aizawa, K. et al., "Producing object-based special effects by fusing multiple differently focused images, http://rlinks2.dialog.com/NASApp/ChannelWEB/DialogProServlet?ChName=engineering", IEEE transactions on circuits and systems for video technology, 2000, pp. 323-330, vol. 10—Issue 2.

Ashikhmin, Michael, "A tone mapping algorithm for high contrast images, http://portal.acm.org/citation.cfm?id=581 91 6and,coll=Portalanddl=ACMandCFID=17220933andCFTOKEN=89149269", ACM International Conference Proceeding Series, Proceedings of the 13th Eurographics workshop on Rendering, 2002, pp. 145-156, vol. 28.

Barreiro, R.B. et al., "Effect of component separation on the temperature distribution of the cosmic microwave background, Monthly Notices of The Royal Astronomical Society, Current Contents Search®. Dialog® File No. 440 Accession No. 23119677", 2006, pp. 226-246, vol. 368—Issue 1.

Beir, Thaddeus, "Feature-Based Image Metamorphosis," In Siggraph '92, Silicon Graphics Computer Systems, 2011 Shoreline Blvd, Mountain View CA 94043, http://www.hammerhead.com/thad/thad.html.

Benedek, C. et al., "Markovian framework for foreground-background-shadow separation of real world video scenes, Proceedings v 3851 LNCS 2006, Ei Compendex®. Dialog® File No. 278 Accession No. 11071345", 7th Asian Conference on Computer Vision, 2006.

Boutell, M. et al., "Photo classification by integrating image content and camera metadata", Pattern Recognition, Proceedings of the 17th International Conference, 2004, pp. 901-904, vol. 4.

Braun M. et al., "Information Fusion of Flash and Non-Flash Images, retrieved from the Internet:URL: http://graphics.stanford.edu/{georgp/vision.htm", 2002, pp. 1-12.

Chen, Shenchang et al., "View interpolation for image synthesis, ISBN:0-89791-601-8, http://portal.acm.org/citation.cfm?id=166153andcoli=GUIDEanddl=GUIDEandCFID=680-9268andCFTOKEN=82843223.", International Conference on Computer Graphics and Interactive Techniques, Proceedings of the 20th annual conference on Computer graphics and interactive techniques, 1993, pp. 279-288, ACM Press.

Eissemann, E. et al., "Flash Photography Enhancement via Intrinsic Relighting, ACM Transactions on URL: http://graphics.stanford.edu/{georgp/vision.htm", 2002, pp. 1-12.

Eriksen, H.K. et al., "Cosmic microwave background component separation by parameter estimation, INSPEC. Dialog® File No. 2 Accession No. 9947674", Astrophysical Journal, 2006, pp. 665-682, vol. 641—Issue 2.

European Patent Office, Communication pursuant to Article 94(3) EPC for EP Application No. 06776529.7, dated Jan. 30, 2008, 3 pages.

European Patent Office, extended European Search Report for EP application No. 07024773.9, dated Jun. 3, 2008, 5 pages.

European Patent Office, extended European Search Report for EP application No. 07756848.3, dated May 27, 2009, 4 pages.

Favaro, Paolo, "Depth from focus/defocus, http://homepages.inf.ed.ac.uk/rbf/Cvonline/LOCAL_COPIES/FAVARO1/dfdtutorial.html.", 2002.

Final Office Action mailed Feb. 4, 2009, for U.S. Appl. No. 11/319,766, filed Dec. 27, 2005.

Final Office Action mailed Jun. 24, 2009, for U.S. Appl. No. 11/744,020, filed May 3, 2007.

Haneda, E., "Color Imaging XII: Processing, Hardcopy, and Applications", Proceedings of Society of Optical Engineers, 2007, vol. 6493.

Hashi Yuzuru et al., "A New Method to Make Special Video Effects. Trace and Emphasis of Main Portion of Images, Japan Broadcasting Corp., Sci. and Techical Res. Lab., JPN, Eizo Joho Media Gakkai Gijutsu Hokoku, http://rlinks2.dialog.com/NASApp/ChannelWEB/DialogProServlet?ChName=engineering", 2003, pp. 23-26, vol. 27.

Heckbert, Paul S., "Survey of Texture Mapping, http://citeseer.ist.psu.edu/135643.html", Proceedings of Graphics Interface '86. IEEE Computer Graphics and Applications, 1986, pp. 56-67 and 207-212.

Homayoun Kamkar-Parsi, A., "A multi-criteria model for robust foreground extraction, http://portal.acm.org/citation.cfm?id=1099410andcoll=Porialanddl=ACMandCFID=17220933andCFTOKEN=89149269", Proceedings of the third ACM international workshop on Video surveillance and sensor networks, 2005, pp. 67-70, ACM Press.

Jin, Hailin et al., "A Variational Approach to Shape from Defocus, {ECCV} (2), http://citeseerist.psu.edu/554899.html", 2002, pp. 18-30.

Jin, J., "Medical Imaging, Image Processing, Murray H. Loew, Kenneth M. Hanson, Editors", Proceedings of SPIE, 1996, pp. 864-868, vol. 2710.

Kelby, Scott, "Photoshop Elements 3: Down and Dirty Tricks, ISBN: 0-321-27835-6, One Hour Photo: Portrait and studio effects", 2004, Chapter 1, Peachpit Press.

Kelby, Scott, "The Photoshop Elements 4 Book for Digital Photographers, XP002406720, ISBN: 0-321-38483-0, Section: Tagging Images of People (Face Tagging)", 2005, New Riders.

Khan, E.A., "Image-based material editing, http://portal.acm.org/citation.cfm?id=1141937andcoll=GUIDEanddl=GUIDEandCFID=68-09268andCFTOKEN=82843223", International Conference on Computer Graphics and Interactive Techniques, 2006, pp. 654 663, ACM Press.

Komatsu, Kunitoshi et al., "Design of Lossless Block Transforms and Filter Banks for Image Coding, http://citeseerist.psu.edu/komatsu99design.html".

Leray et al., "Spatially distributed two-photon excitation fluorescence in scattering media: Experiments and timeresolved Monte Carlo simulations", Optics Communications, 2007, pp. 269-278, vol. 272—Issue 1.

Leubner, Christian, "Multilevel Image Segmentation in Computer-Vision Systems, http://citeseerist.psu.edu/565983.html".

Li, Han et al., "A new model of motion blurred images and estimation of its parameter", Acoustics, Speech, and Signal Processing, IEEE International Conference on ICASSP '86, 1986, pp. 2447-2450, vol. 11.

Li, Liyuan et al., "Foreground object detection from videos containing complex background, http://portaLacm.org/citation.cfm?id=957017andcoll=Portalanddl=ACMandCFID=17220933andCFTCKE N=89149269", Proceedings of the eleventh ACM international conference on Multimedia, 2003, pp. 2-10, ACM Press.

Li, S. et al., "Multifocus image fusion using artificial neural networks, DOI=http://dx.doi.org/10.1016/S0167-8655(02)00029-6", Pattern Recogn. Lett, 2002, pp. 985-997, vol. 23.

McGuire, M. et al., "Defocus video matting, DOI=http://doi.acm.org/10.1145/1073204.1073231", ACM Trans. Graph., 2005, pp. 567-576, vol. 24—Issue 3.

Neri, A. et al., "Automatic moving object and background separation Ei Compendex®. Dialog® File No. 278 Accession No. 8063256", Signal Processing, 1998, pp. 219-232, vol. 66—Issue 2.

Non-Final Office Action mailed Aug. 6, 2008, for U.S. Appl. No. 11/319,766, filed Dec. 27, 2005.

Non-Final Office Action mailed Jul. 13, 2009, for U.S. Appl. No. 11/421,027, filed May 30, 2006.

Non-Final Office Action mailed Mar. 10, 2009, for U.S. Appl. No. 11/217,788, filed Aug. 30, 2005.

Non-Final Office Action mailed Nov. 25, 2008, for U.S. Appl. No. 11/217,788, filed Aug. 30, 2005.

Non-Final Office Action mailed Sep. 11, 2008, for U.S. Appl. No. 11/744,020, filed May 3, 2007.

Office Action in co-pending European Application No. 06 776 529.7-2202, entitled "Communication Pursuant to Article 94(3) EPC", dated Sep. 30, 2008, 3 pages.

Owens, James, "Method for depth of field (DOE) adjustment using a combination of object segmentation and pixel binning", Research Disclosure, 2004, vol. 478, No. 97, Mason Publications.

Pavlidis Tsompanopoulos Papamarkos, "A Multi-Segment Residual Image Compression Technique" http://citeseerist.psu.edu/554555.html.

PCT International Preliminary Report on Patentability, for PCT Application No. PCT/EP2006/007573, dated Jul. 1, 2008, 9 pages.

PCT International Preliminary Report on Patentability, for PCT Application No. PCT/EP2006/008229, dated Aug. 19, 2008, 15 pages.

PCT International Preliminary Report on Patentability, for PCT Application No. PCT/US2007/061956, dated Oct. 27, 2008, 3 pages.

PCT International Preliminary Report on Patentability, for PCT Application No. PCT/US2007/068190, dated Nov. 4, 2008, 8 pages.

PCT International Search Report and the Written Opinion of the International Searching Authority, or the Declaration for PCT application No. PCT/US2007/068190, dated Sep. 29, 2008, 10 pages.

PCT Notification of Transmittal of the International Search Report and the Written Opinion of the International Searching Authority, or the Declaration (PCT/EP2006/007573), dated Nov. 27, 2006.

PCT Notification of Transmittal of the International Search Report and the Written Opinion of the International Searching Authority, or the Declaration for PCT application No. PCT/EP2006/008229, dated Jan. 14, 2008, 18 pages.

PCT Notification of Transmittal of the International Search Report and the Written Opinion of the International Searching Authority, or the Declaration, for PCT Application No. PCT/EP2006/005109, 14 pages.

Petschnigg, G. et al., "Digital Photography with Flash and No Flash Image Pairs", The Institution of Electrical Engineers, 2004, pp. 664-672.

Potmesil, Michael et al., "A lens and aperture camera model for synthetic image generation, ISBN:0-89791-045-1, http://portal.acm.org/citation.

cfm?id=806818andcoli=GUIDEanddl=GUIDEandCFID=680-9268andCFTOKEN=82843222.", International Conference on Computer Graphics and Interactive Techniques, Proceedings of the 8th annual conference on Computer graphics and interactive techniques, 1981, pp. 297-305, ACM Press.

Rajagopalan, A.N. et al., "Optimal recovery of depth from defocused images using an mrf model, http://citeseer.ist.psu.edu/rajagopalan98optimal.html", In Proc. International Conference on Computer Vision, 1998, pp. 1047-1052.

Reinhard, E. et al., "Depth-of-field-based alpha-matte extraction, http://doi.acm.org/10.1145/1080402.1080419", In Proceedings of the 2nd Symposium on Applied Perception in Graphics and Visualization, 2005, pp. 95-102, vol. 95.

Sa, A. et al., "Range-Enhanced Active Foreground Extraction, XP010851333", Image Processing, IEEE International Conference, 2005, pp. 81-84.

Saito, T. et al., "Separation of irradiance and reflectance from observed color images by logarithmical nonlinear diffusion process, Ei Compendex®. Dialog® File No. 278 Accession No. 10968692", Proceedings of Society for Optical Engineering Computational Imaging IV—Electronic Imaging, 2006, vol. 6065.

Schechner, Y.Y. et al., "Separation of transparent layers using focus, http:I/citeseer.ist.psu.edu/article/schechner98separation.html", Proc. ICCV, 1998, pp. 1061-1066.

Serrano, N. et al., "A computationally efficient approach to indoor/outdoor scene classification, XP010613491, ISBN: 978-0-7695-1695-0.", Pattern Recognition, 2002 Proceedings. 16th International Conference, IEEE Comput. Soc, 2002, pp. 146-149, vol. 4.

Simard, Patrice Y. et al., "A foreground/background separation algorithm for image compression, Ei Compendex®. Dialog® File No. 278 Accession No. 9897343", Data Compression Conference Proceedings, 2004.

Subbarao, M. et al., "Depth from Defocus: A Spatial Domain Approach, Technical Report No. 9212.03, http://citeseerist.psu.edu/subbarao94depth.html", Computer Vision Laboratory, SUNY.

Subbarao, Murali et al., "Noise Sensitivity Analysis of Depth-from-Defocus by a Spatial-Domain Approach, http://citeseer.ist.psu.edu/subbarao97noise.html".

Sun, J. et al., "Flash Matting", ACM Transactions on Graphics, 2006, pp. 772-778, vol. 25—Issue 3.

Swain C. and Chen T. "Defocus-based image segmentation" In Proceedings ICASSP-95, vol. 4, pp. 2403-2406, Detroit, MI, May 1995, IEEE.

Szummer, M. et al., "Indoor-outdoor image classification", Content-Based Access of Image and Video Database, Proceedings., IEEE International Workshop, IEEE Comput. Soc, 1998, pp. 42-51.

Television Asia, "Virtual sets and chromakey update: superimposing a foreground captured by one camera onto a background from another dates back to film days, but has come a long way since," Television Asia, vol. 13, No. 9, p. 26, Nov. 2006. Business and Industry®. Dialog® File No. 9 Accession No. 4123327.

Tzovaras, D. et al., "Three-dimensional camera motion estimation and foreground/background separation for stereoscopic image sequences, INSPEC. Dialog® File No. 2 Accession No. 6556637.", Optical Engineering, 1997, pp. 574-579, vol. 36—Issue 2.

U.S. Appl. No. 10/772,767, filed Feb. 4, 2004, by inventors Michael J. DeLuca, et al.

Utpal, G. et al., "On foreground-background separation in low quality document images, INSPEC. Dialog® File No. 2 Accession No. 9927003", International Journal on Document Analysis and Recognition, pp. 47-63, vol. 8—Issue 1.

Watanabe, Masahiro et al., "Rational Filters for Passive Depth from Defocus", 1995.

Yu, Jingyi et al., "Real-time reflection mapping with parallax, http//portal.acm.org/citation.cfm?id=1 053449andcoll=Portalanddl=ACMandCFID=17220933and CFTOKEN=89149269", Symposium on Interactive 3D Graphics, Proceedings of the 2005 symposium on Interactive 3D graphics and games, 2005, pp. 133-138, ACM Press.

Ziou, D. et al., "Depth from Defocus Estimation in Spatial Domain, http://citeseer.ist.psu.edu/ziou99depth.html", CVIU, 2001, pp. 143-165, vol. 81—Issue 2.

Final Office Action mailed Sep. 18, 2009, for U.S. Appl. No. 11/319,766, filed Dec. 27, 2005.

Final Office Action mailed Sep. 15, 2010, for U.S. Appl. No. 11/744,020, filed May 3, 2007.

Non-Final Office Action mailed Mar. 31, 2010, for U.S. Appl. No. 11/744,020, filed May 3, 2007.

Notice of Allowance mailed Nov. 19, 2010, for U.S. Appl. No. 11/573,713, filed Feb. 14, 2007.

* cited by examiner

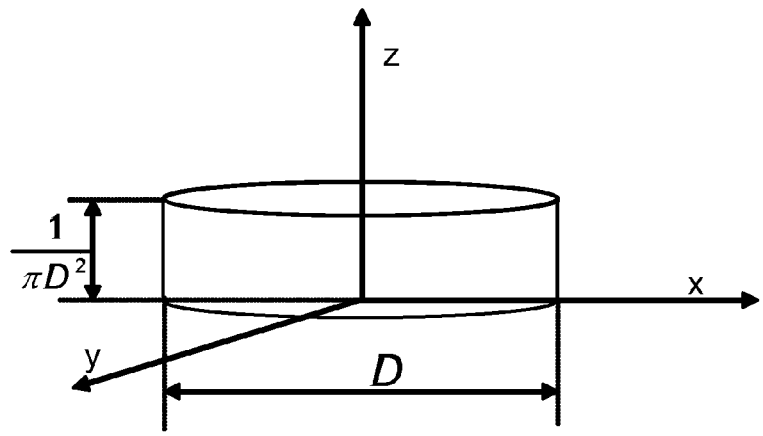
Figure 1
(Prior Art)
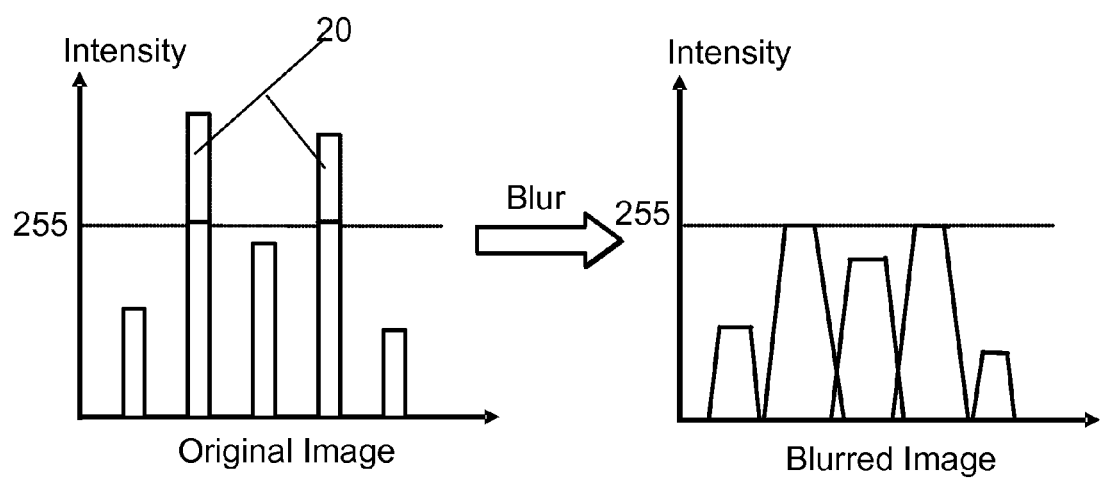
Figure 2a
(Prior Art)
Figure 2b
(Prior Art)

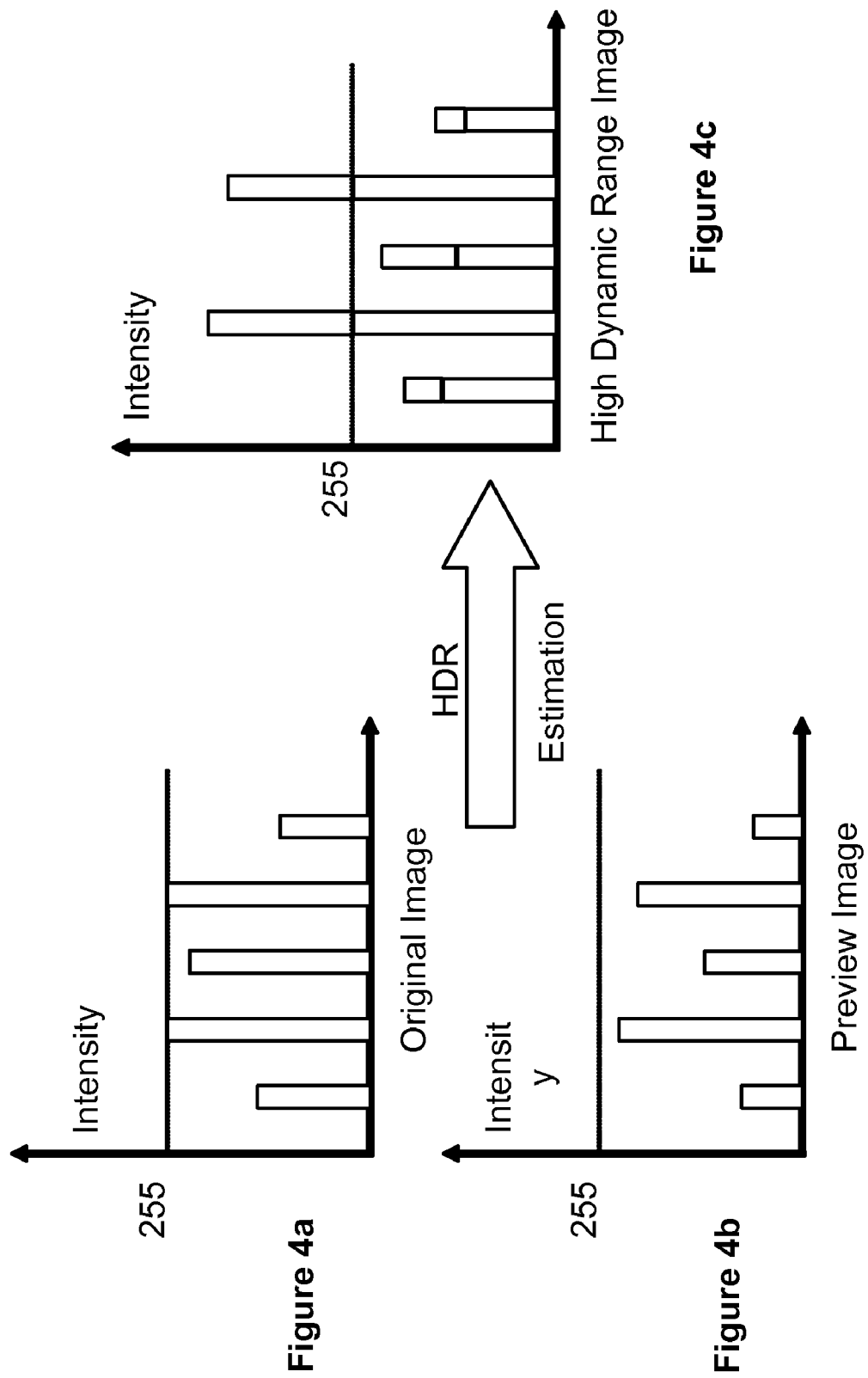

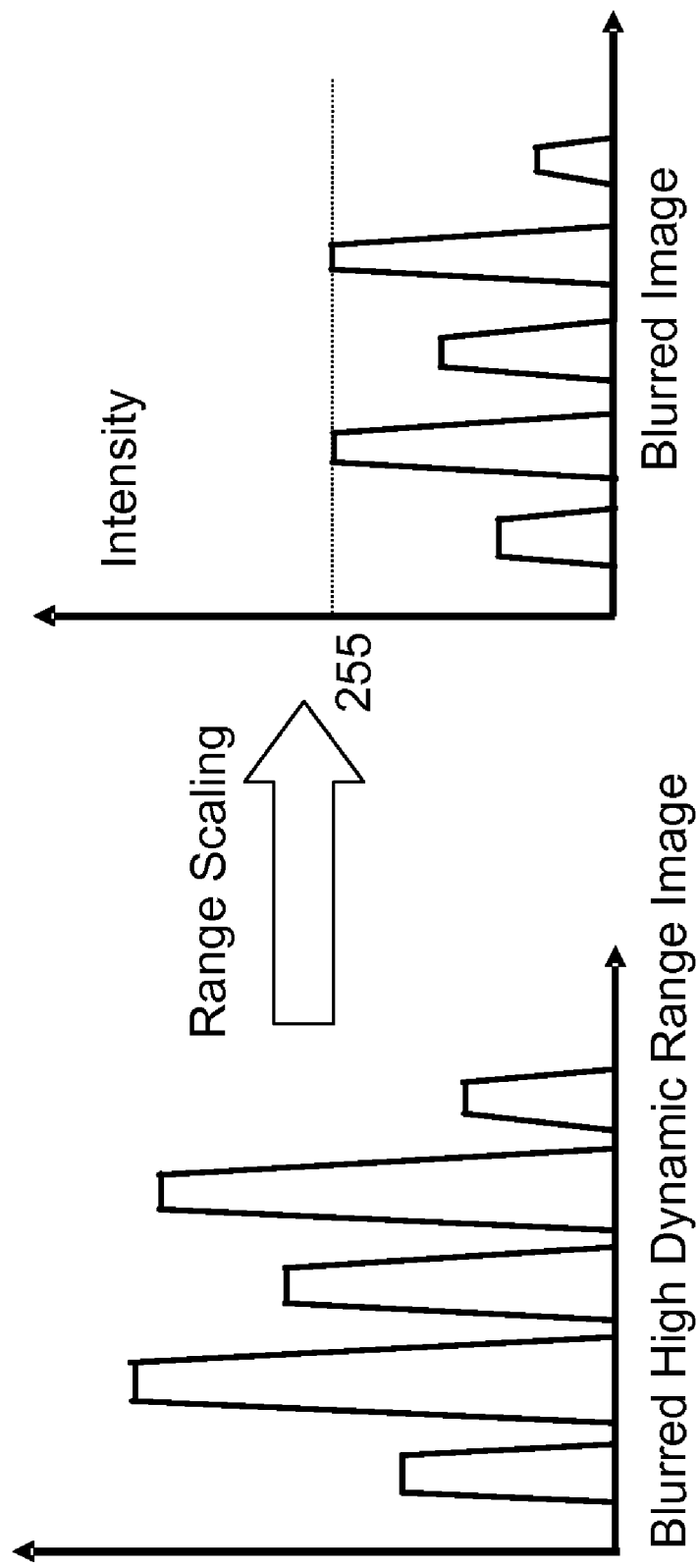

IMAGE BLURRING

PRIORITY

This application is a divisional of U.S. patent application Ser. No. 11/673,560, filed Feb. 10, 2007, now U.S. Pat. 7,469,071, which claims the benefit of priority to U.S. provisional patent application No. 60/773,714, filed Feb. 14, 2006, which are hereby incorporated by reference.

BACKGROUND

1. Field of the Invention

The present invention relates to image blurring, and in particular, to a system and method for creating blur in an image to reduce the depth of field of the image.

2. Description of the Related Art

In digital cameras, the depth of field (hereinafter "DOF") is typically much greater than for cameras which use film due to the image sensor being somewhat smaller than in a 35 mm film negative. This means that portrait images captured with digital cameras, in particular, will tend to have the background in sharp focus, which is often not desirable as a photographer may wish to emphasize a person's face and de-emphasize the background of the picture. This problem may be corrected by careful photography combined with careful use of camera settings.

Alternatively, portrait images may be blurred semi-manually by professional photographers using desktop computer image processing software after an image has been captured. This involves manual intervention and is often time-consuming. Nonetheless, such conventional blurring software may apply various techniques using convolution kernels to create blurring effects, as illustrated in FIGS. 1 and 2.

Generically, convolution can be expressed according to the equation below:

$$B = I * g$$

where B is the blurred image, I is the original image and g is the convolution kernel. Convolution blur may be applied on a pixel-by-pixel basis. So, for a particular pixel with coordinates (x,y), the convolution with a kernel of size (M×N) can be written as:

$$B(x, y) = \sum_{j}^{N} \sum_{i}^{M} I(x-i, y-j) g(i, j)$$

The size and shape of the kernel influence the blurring result. The size determines the strength of the blur and therefore the perceived depth of the object. The shape determines the visual aspect of the blur and is related to what is called "circle of confusion".

A circular kernel of a diameter D has the following analytical form $$g(i, j) = \begin{cases} \frac{1}{\pi D^2} & \text{if } \sqrt{i^2 + j^2} \leq D \\ 0 & \text{otherwise} \end{cases}$$

and a geometrical shape of a cylinder or "pillbox", as is illustrated in FIG. 1. Referring now to FIGS. 2a-2b, the effects of a convolution kernel on a row of pixels within a flash image of a scene are illustrated. The most intense (bright areas) of the original image, i.e., in this example pixels 2 and 4 taken from left to right, undergo saturation clipping to the maximum of the dynamic intensity range (e.g., 255 for 8 bit/pixel image) as depicted by dashed outlines 20, while pixels 1, 3 and 5 are not clipped. Due to convolution, a resulting blurred image lacks the contrast and sharpness present in the scene, therefore creating a less appealing visual effect. Such blurring techniques simply do not achieve realistic results and do not resemble an image with a shallow DOF as desired.

SUMMARY OF THE INVENTION

A method is provided for creating blur in an image acquired with a digital camera for printing or electronic display or both. A first image of a scene is acquired at a first exposure level, and a second image of nominally the same scene is acquired at a second exposure level. At least one region of the second image includes one or more pixels having saturated intensity values. For at least one of said saturated pixels, one or more values are extrapolated from the first image. A third image is generated including pixels of the second image having non-saturated values, and pixels having the one or more extrapolated values. At least a portion of the third image is blurred and re-scaled.

The first image may be acquired without a flash and the second image may be acquired with a flash exposure level.

A value may be extrapolated for a saturated pixel by calculating at least one ratio of an intensity of a pixel in said first image to an intensity of at least one non-saturated pixel, and providing the extrapolated value for a selected pixel in accordance with the intensity ratio. A non-saturated pixel may include a pixel in the first image which corresponds to a pixel in the second image which has not undergone saturation clipping.

One or more portions of said third image may be determined to correspond to foreground of the image, and portions may be determined which correspond to background of the image. The background portions may be blurred.

Regions of said first and second images may be aligned at least in respect of the at least one portion. The first image may be a relatively low resolution image and the second image may be a higher resolution image, and the resolutions of the first and second images may be matched. The resolution the resolution of the second image may be downsampled to the resolution of said first image, or the the resolution of the first image may be upsampled to the resolution of the second image, or a combination thereof The blurring of the third image may be performed by applying a convolution kernel to the at least one portion. The kernel may be a circular kernel.

The third image may include a copy of the second image modified by replacing the saturated intensity values with the extrapolated values.

The third image may include the second image modified by replacing the saturated intensity values with the extrapolated values.

The re-scaling may include scaling the blurred portion of the third image to a range associated with the second image.

A further method is provided for generating a digital image. At least two images are acquired, including a full resolution image having one or more pixels with a saturated intensity value. One or more intensity ratios are determined from unsaturated pixels of another of the at least two acquired images. The full resolution image is modified including restoring the one or more intensity ratios determined from the unsaturated pixels of the other acquired image. A portion of the modified image is blurred, and the modified image is stored, displayed or printed, or combinations thereof.

The modifying may include adding intensity to the one or more saturated pixels, or subtracting intensity from one or more unsaturated pixels, or a combination thereof.

The blurring may include determining one or more portions of the modified image which correspond to foreground of the image and portions which correspond to background of the image, and blurring the background portions. The blurred portion of the modified image may be resealed.

One or more processor readable storage devices are also provided with processor readable code embodied thereon for programming one or more processors to perform a method of creating blur in a digital image as disclosed herein.

A digital image processing device is also provided which is operable to blur an acquired image, and includes a controller and the one or more processor readable storage devices.

BRIEF DESCRIPTION OF THE DRAWINGS

Preferred and alternative embodiments will now be described, by way of example, with reference to the accompanying drawings, in which:

FIG. 1 depicts a conventional circular convolution kernel;

FIGS. 2a-2b depict conventional image blurring using a circular convolution kernel;

FIG. 4a-4c depict graphical representations of corresponding portions of a low-resolution or full resolution non-flash image and/or a preview image, a full resolution flash image or an image captured under another high light intensity exposure condition, and a high dynamic range (HDR) image derived therefrom according to another embodiment; and FIG. 5 depicts a graphical representation of a portion of a blurred image of the HDR image of FIG. 4c, and a re-scaled blurred image derived therefrom according to another embodiment.

DETAILED DESCRIPTION OF THE EMBODIMENTS

Figure 3:
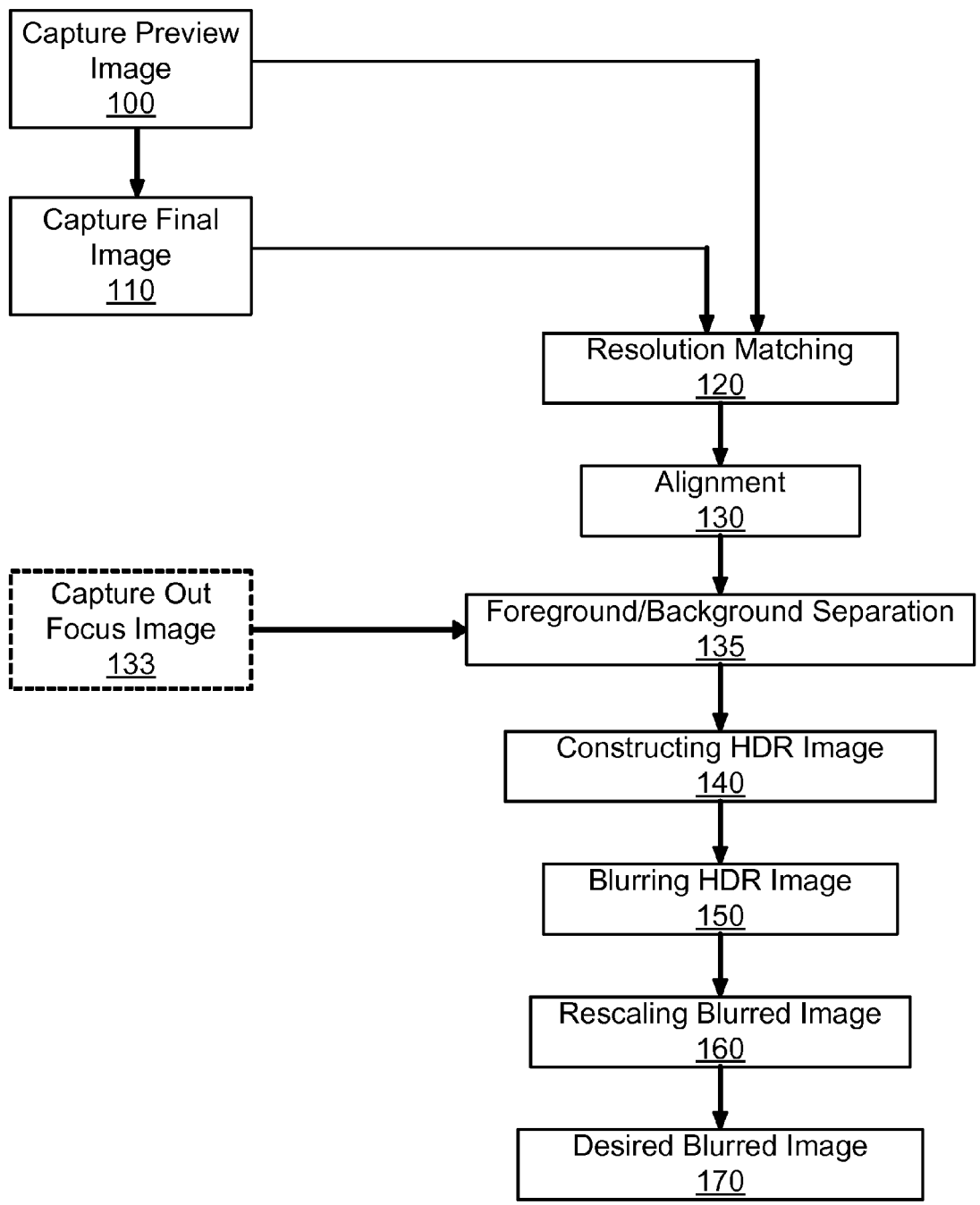
FIG. 3 illustrates a flow diagram in accordance with one embodiment.

Techniques and components for obtaining a more realistic blur in a digitally-acquired image similar to the low DOF blur generated by a conventional film camera are provided.

The low contrast and sharpness associated with conventional blurring techniques are mitigated or reduced or eliminated in accordance with embodiments described herein. Furthermore, lens effects of circle of confusion are emulated, as described in more detail below.

As illustrated in FIGS. 2a-2b, saturation clipping leads to a loss of high dynamic range, HDR, information about the image. In one embodiment of the present invention, this information is advantageously recovered to provide a more realistic blurring of an image of a scene.

Referring now to FIG. 3, a low-resolution non-flash image of a scene (herein after referred to as a preview image) is captured at 100 prior to capturing a full-resolution flash image of a scene at 110. However, it will be appreciated that alternatively the preview may comprise any one or more of a series of captured non-flash low-resolution images. Alternatively, the non-flash image of the scene can be captured after the full-resolution flash version and as such may be a post-view image. The preview image may also be another full-resolution image or a down-sampled version thereof. For ease of reference, the term "preview image" is intended to include each of these. This embodiment may also be applied even where the full-resolution image 110 is captured without a flash. In such cases, the full-resolution image 110 may be taken at an exposure level which is the same as or different than, and is preferably higher than, that of the preview image 100 and so may include more pixels with saturated values than the preview image.

The preview image may be utilized for various tasks such as auto-focus, white balance or to estimate exposure parameters. Preferably, the preview image is stored in a memory of the camera for use with other processing techniques. Alternatively the preview image may be stored in any suitable memory device, or may be only temporarily used or stored in the camera.

The remainder of the blocks in the flow process illustrated at FIG. 3 are described below with reference to FIGS. 4a-4c and 5, which further illustrate some of those process blocks. Referring to FIGS. 4a-4c, for purposes of illustration, intensity values of five pixels, which are preferably only a portion of one full row of multiple rows of pixels of a full resolution image or original image (FIG. 4a), a preview image (FIG. 4b) and a high dynamic range image (FIG. 4c), or HDR image, are graphically represented.

Intensity levels of the portion of the row of pixels of the full resolution image, that may have been taken with a flash or under another high light exposure condition, are graphically represented at FIG. 4a. As earlier illustrated with reference to FIG. 2a, this full resolution image has been subjected to saturation clipping due to the dynamic intensity range limit. In this case, pixels 2 and 4, taken from left to right, have been clipped from values higher than 255 each to the limit of 255, while pixels 1, 3 and 5 have not been clipped. Therefore valuable information about the scene is eliminated from the full resolution, high exposure image. For one, the ratio of intensities of pixels 2 and 4 to pixels 1, 3 and 5 has been altered. The ratio between pixels 2 and 4 may also have been altered in the clipping process, and in fact was in the example illustrated at FIG. 2a.

As a preview image in the example illustrated at FIG. 4b is preferably a non-flash image, saturation clipping generally does not occur and as such no exposure information or relatively little exposure information about the scene is lost. In FIG. 4b, all five representative pixels has an intensity level below 255, so that none are clipped and the actual intensity ratios between each of the five pixels remains intact.

In continuing with the description of the process of FIG. 3, the preview and full resolution images are brought to the same resolution at 120, i.e., their resolutions are matched. In the preferred embodiment, the resolution of the images is matched by downsampling the flash image to the resolution of the preview image. Alternatively, the resolutions of the images may be matched by any combination of upsampling the preview image or downsampling the resolution of the flash image. However it will be appreciated any suitable means of bringing the images to the same resolution may be employed. Of course, if the resolutions are the same to begin with then 120 may be skipped.

The preview and full resolution images are then aligned at 130, using image registration techniques, to compensate for any slight movement in the scene or camera between taking these images. Alignment may be performed globally across entire images or locally using various techniques, e.g., as may be described in co-pending U.S. patent application Ser. No. 11/217,788 filed Aug. 30, 2005 (Case Ref: FN122), which is assigned to the same assignee, incorporated by reference, and not otherwise further expressly described herein. Again, if the images are already fully aligned, then the alignment at 130 would involve no modifications.

Utilizing intensity information derived from the preview image, a high dynamic range (HDR) image is constructed at 140 from the full resolution image. The HDR image incorporates an estimate of the information (bright areas) eliminated from the flash image by saturation clipping. The dashed rectangles above each of the intensity level bar representations from each of the five pixels in FIG. 4c illustrates these estimates. FIG. 2a showed dashed rectangle only over pixels 2 and 4 which were the only pixels clipped. FIG. 4c has not only pixels 2 and 4 reduced to the limit of 255, but has pixels 1, 3 and 5 reduced as well. One or both of pixels 2 and 4 could alternatively be reduced below 255 in the HDR image of FIG. 4c. The ratios of the intensities between the pixels 2 and 4 to pixels 1, 3 and 5 in the HDR image of FIG. 4c is preferably closer to actual object intensity ratios than FIG. 4a.

In one embodiment, the HDR image is achieved by determining an intensity ratio between two or more neighbouring pixels in the preview image, one of which will be clipped in the flash image; and the intensity values of one or more non-saturated pixels in the flash image. It will however be appreciated that the intensity ratio for each saturated pixel may be determined with respect to one or more non-neighbouring comparison pixels. Using this ratio information, the intensity of each of the clipped pixels of the flash image is extrapolated in proportion to the intensity ratio derived from the corresponding preview image pixel(s).

For example, the ratio of the intensity of a first pixel of a preview image to the intensity of a neighbouring pixel of the preview image is determined. In the case where the first pixel's corresponding pixel in the flash image has been saturation clipped, the intensity of the clipped pixel is increased in accordance with the ratio information in order to restore the pixel to its original intensity ratio with respect to its neighbouring or comparison pixels. This process may be carried out for all saturated pixels to produce a HDR image. All of the pixels may be increased in intensity or decreased in intensity or a combination of increase and decrease, depending on other processes that may be in use such as selected fill-flash (see U.S. application Ser. No. 10/608,810, incorporated by reference). The ratios may be adjusted precisely to preview image ratios, or otherwise as illustrated in FIG. 4c, for example. In this way, the HDR image is made to resemble a flash image and/or high exposure image which was not subjected to saturation clipping. A portion of a row of pixels of the HDR image corresponding to pixels of the original and preview images is depicted graphically in FIG. 4c with the intensity ratios of the preview image being substantially the same as those provided in HDR image when the solid line and dashed line rectangles are each included.

While this illustrative embodiment has been described in terms of providing a separate HDR image from the images 100, 110, another embodiment would provide for adjusting the values of the flash image 110 and using this adjusted image according to the below. In one embodiment, as disclosed in U.S. application Ser. No. 11/217,788 filed Aug. 30, 2005, the HDR image may undergo a digital segmentation process 135 to determine foreground and/or background within at least one portion of the image. In one exemplary implementation, the HDR image is compared to a preview non-flash image 100 of nominally the same scene. Overall light distribution may vary between the two images, because one image or subset of images will be illuminated only with available ambient light while another is illuminated with direct flash light, thereby enabling the HDR image to be separated into foreground and background. As an alternative to using the HDR image, the full resolution and/or flash image 110 can be compared with a preview image 100 to perform foreground/background segmentation which could in turn be applied for use in processing the HDR image; or alternatively a flash and a non-flash preview image or one each full-resolution images could be used for foreground/background segmentation again for use in processing a HDR image, as could two flash or two non-flash images when captured at different exposure levels such that advantages illustrated at FIGS. 3-5 and in corresponding text description herein may be achieved.

Alternatively, foreground and background regions of a HDR image may be separated at 135 (FIG. 3) by a method disclosed in U.S. provisional application Ser. No. 60/773,714. In this embodiment, one flash or non-flash image of a scene may be taken with the foreground more in focus than the background and which can be converted to a HDR image, e.g., according to the above. The HDR image may then be stored in, e.g., DCT-coded format or similar. A second out of focus image of nominally the same scene may be taken at 133 (FIG. 3), and also stored in DCT-coded format. The two DCT-coded images may then be compared and regions of the HDR image assigned as foreground or background according to whether the sum of selected high order DCT coefficients are decreased or increased relative to equivalent regions of the second image.

In one embodiment, as depicted in FIGS. 5a-5b, regions of the HDR image labeled as background from the above description may be blurred at 150 of FIG. 3 with a circular kernel that resembles the PSF (point spread function) of a lens of a camera to emulate a real effect of optical blur. FIG. 5a illustrates intensity levels of five exemplary pixels of the HDR image which are blurred. A circular shaped kernel may be advantageously employed because it approximates a real lens aperture effect. Also, since the lens does not amplify or reduce the amount of light passing through, the convolution kernel is derived such as the sum of all its values equals 1, i.e.:

$$\sum_{i,j}^{M,N} g(i, j) = 1$$

Other suitably shaped kernels may be utilized. The range of the blurred image produced in step 150 of FIG. 3 is then scaled back, as illustrated at FIG. 5b and at block 160 of FIG. 3, to the range of the full resolution image to produce a realistically blurred image at block 170 similar to the low depth-of-field blur generated by a film-based camera.

It will be seen that many variations of the above embodiments are possible. For example, image processing software described in FIG. 3 can be implemented completely in a camera or as part of an external processing device such as a desktop computer which is provided with the images 100, 110, 133.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, that which is described as background, the invention summary, the abstract, the brief description of the drawings and the drawings themselves, as well as all references cited above herein, and U.S. published applications nos. 2005/0068448 and 2006/0098237, and U.S. provisional application 60/746,363, which are assigned to the same assignee, are hereby incorporated by reference into the detailed description of the preferred embodiments as providing alternative embodiments.

The invention claimed is:

1. A digital image processing device operable to blur an acquired image, comprising a controller and one or more processor readable storage devices having processor readable code embodied thereon, said processor readable code for programming one or more processors to perform a method of generating a digital image, the method comprising:
    (a) acquiring at least two images, including a full resolution image having one or more pixels with a saturated intensity value;
    (b) determining one or more intensity ratios from unsaturated pixels of another of the at least two acquired images that was taken at a lower exposure level than the full resolution image;
    (c) modifying the full resolution image including restoring the one or more intensity ratios determined from the unsaturated pixels of said other acquired image;
    (d) blurring a portion of the modified image; and
    (e) printing, image processing, or electronically storing, transmitting or displaying the modified image, or combinations thereof.

2. The device of claim 1, wherein the modifying comprises adding intensity to the one or more saturated pixels.

3. The device of claim 2, wherein the modifying further comprises subtracting intensity from one or more unsaturated pixels.

4. The device of claim 1, wherein the modifying further comprises subtracting intensity from one or more unsaturated pixels.

5. The device of claim 1, the blurring comprising:
    determining one or more portions of said modified image which correspond to foreground of the image and portions which correspond to background of the image; and blurring said background portions.

6. The device of claim 1, the method further comprising re-scaling the blurred portion of the modified image.

7. A method of generating a digital image, the method comprising:
    (a) acquiring at least two images, including a full resolution image having one or more pixels with a saturated intensity value;
    (b) determining one or more intensity ratios from unsaturated pixels of another of the at least two acquired images that was taken at a lower exposure level than the full resolution image;
    (c) modifying the full resolution image including restoring the one or more intensity ratios determined from the unsaturated pixels of said other acquired image;
    (d) blurring a portion of the modified image; and
    (e) printing, image processing, or electronically storing, transmitting or displaying the modified image, or combinations thereof.

8. The method of claim 7, wherein the modifying comprises adding intensity to the one or more saturated pixels.

9. The method of claim 8, wherein the modifying further comprises subtracting intensity from one or more unsaturated pixels.

10. The method of claim 7, wherein the modifying further comprises subtracting intensity from one or more unsaturated pixels.

11. The method of claim 7, the blurring comprising:
    determining one or more portions of said modified image which correspond to foreground of the image and portions which correspond to background of the image; and blurring said background portions.

12. The method of claim 7, the method further comprising re-scaling the blurred portion of the modified image.

13. One or more non-transitory processor-readable storage devices having processor readable code embodied thereon for programming one or more processors to perform a method of generating a digital image, the method comprising:
    (a) acquiring at least two images, including a full resolution image having one or more pixels with a saturated intensity value;
    (b) determining one or more intensity ratios from unsaturated pixels of another of the at least two acquired images that was taken at a lower exposure level than the full resolution image;
    (c) modifying the full resolution image including restoring the one or more intensity ratios determined from the unsaturated pixels of said other acquired image;
    (d) blurring a portion of the modified image; and
    (e) printing, image processing, or electronically storing, transmitting or displaying the modified image, or combinations thereof.

14. The one or more non-transitory processor-readable storage devices of claim 13, wherein the modifying comprises adding intensity to the one or more saturated pixels.

15. The one or more non-transitory processor-readable storage devices of claim 14, wherein the modifying further comprises subtracting intensity from one or more unsaturated pixels.

16. The one or more non-transitory processor-readable storage devices of claim 13, wherein the modifying further comprises subtracting intensity from one or more unsaturated pixels.

17. The one or more non-transitory processor-readable storage devices of claim 13, the blurring comprising:
    determining one or more portions of said modified image which correspond to foreground of the image and portions which correspond to background of the image; and blurring said background portions.

18. The one or more non-transitory processor-readable storage devices of claim 13, the method further comprising re-scaling the blurred portion of the modified image.

* * * * *